Patented June 27, 1950

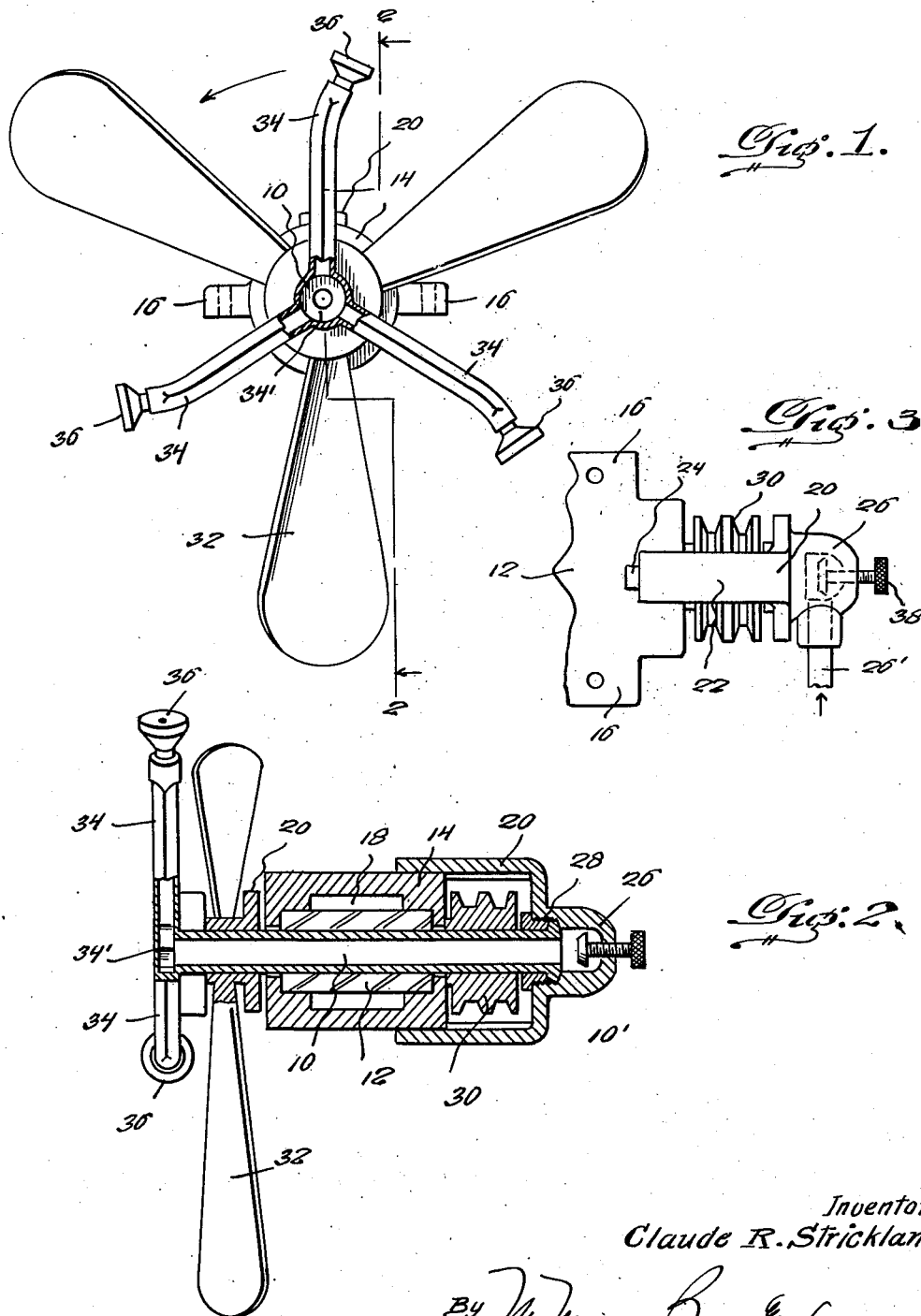

2,512,782

UNITED STATES PATENT OFFICE 2,512,782

SPRAYING APPARATUS

Claude Roscoe Strickland, St. Petersburg, Fla.

Application September 28, 1945, Serial No. 619,095

1 Claim. (Cl. 261—88)

This invention appertains to improvements in spraying apparatus generally, and more particularly to a power driven type of such apparatus, especially designed for dispensing liquids, such as oil, larvacide, insecticide, etc., over large areas of the countryside, for the control and destruction of insect pests.

An object of the invention is to provide an air-liquid centrifuge for the above stated purpose, which may be direct or indirectly driven by a suitable prime mover, to effect a wide distribution of such liquids in a mist, the fineness of which being dependent upon the operating speed of the centrifuge.

Another object of the invention has to do with the provision of a spraying device of this kind, wherein a plurality of hollow radial arms are employed to produce the desired centrifugal force to effect the distribution of the air-liquid emulsion, the inner ends of the arms connecting with a hollow shaft and creating a vacuum therein which acts to draw the liquid from an intake receiver with which the shaft is connected, while the terminal ends of the arms are adapted to be equipped with suitable nozzles, such as the disc, air-cup, flit type of spray heads.

A further object of the invention lies in the provision of a spray apparatus as hereinbefore characterized, wherein a fan or propeller is mounted on the shaft for rotation therewith, the same being positioned rearwardly of the spray arms a sufficient distance that the latter will in no way impede the air-flow over the surfaces of its blades, and the whip of the air by the spray arms and the creation of a vacuum by them, during the rotation of the assembly, will act to prevent any undue deposit of the liquid on the latter.

With the foregoing and other objects and advantages in view, the invention resides in the certain new and useful combination, construction, and arrangement of parts, as will be hereinafter more fully described, set forth in the appended claim, and illustrated in the accompanying drawing, in which:

Figure 1 is a front elevation, partly in section, of a practical embodiment of my spray apparatus;

Figure 2 is a vertical, longitudinal section, taken through the line 2—2 on Figure 1, looking in the direction of the arrows; and, Figure 3 is a fragmentary top plan view.

My invention, as it is exemplified in the drawing, is comprised in a hollow shaft 10, journalled intermediate its ends in roller bearings 12, which are mounted in a substantially cylindrical housing 14 having laterally offset lugs 16 to receive suitable fastenings (not shown), such as bolts or the like, for securement to a stationary or a mobile framework (not shown). An annular chamber 18 is formed within the housing 14, about the roller bearings 12, to retain a lubricant in contact therewith.

Mounted on the housing 14 is a substantially U-shaped yoke 20, which has its parallel legs ribbed, as at 22, on their inner sides and engaged in grooves 24, formed in the outer surface of the housing, substantially as shown.

The bight end of the yoke 20 is provided with an outwardly extending receiver or intake chamber 26, which opens through the yoke end to communicate with the bore extending forwardly through the shaft 10, the rear end of the latter being provided with a bearing collar or flange 10', seated within the opening of the chamber and held in place by a packing nut 28. Keyed on the shaft 10, within the yoke 20, is a grooved pulley or sheave 30, driven by the belt drive of the shaft from a suitable prime mover (not shown). If a direct drive of the shaft is desired, its rear end may be extended entirely through the receiver 26, for the coupling of its free end to the prime mover, in which case, however, the portion of the shaft within the receiver will be provided with radial openings to establish communication between the shaft bore and the interior of the receiver, as is well understood by those skilled in the art. A hose connection or the like 26' opens into the receiver 26 through its side wall, for the connection thereto of a source of supply of the liquid to be sprayed from the apparatus.

Keyed on the front end of the shaft 10, immediately beyond the front end of the bearing housing 12, is the hub of a fan or propeller 32, while radiating from the extreme front end of the shaft, in spaced relation with respect to the fan, is a series of hollow arms 34, three being shown to correspond to the number of blades of the fan or propeller 32, between which they are centered, substantially as shown. The ducts, extending through the arms 34, have their inner ends opening into a hollow hub 34', which is in communication with the bore of the shaft 10, while their outer ends open into suitable nozzles or spray heads 36, the latter, as before stated, preferably taking the form of the disc, air-cup, flit type. As shown in Figure 1, the outer end portion of each of the arms 34 is preferably given a slight bend or lean in the direction opposite to the direction of rotation of the fan-shaft assembly, so as to effect an appreciable increase in the pressure of discharge, i. e., atomizing, of liquid from the nozzles or spray heads 36, and a stronger suction effect created within the arm ducts and the bore of the shaft.

In operation of the centrifuge as it is thus constructed and arranged, the sheave 30 will be belted to a power drive and upon rotation of the shaft 10 and the arms 34, the centrifugal force generated within the arms creates a vacuum, i. e., suction, in the bore of the shaft, which draws the liquid from the receiver 26 and forces it outward through the nozzles 36. An air-vacuum brake valve 38 is provided at the receiver 26 and is adjustable to vary the flow of the liquid from the receiver into the bore of the shaft 10. The centrifuge is capable of operating at any horizontal or vertical angle and its operation in the vertical plane is limited only by the greatest angle of depression or elevation at which the power drive, i. e., prime mover, will function efficiently.

In actual practice with the apparatus, operational speeds of from 1000 to 4000 R. P. M., of the shaft, fan, and spray arm assembly, have been found to produce sprays ranging from rain droplet effects to the finest mist, with application distances up to 400 feet, without wind and up to 700 feet, or better, with a fair wind-drift. By positioning the spray nozzles 36 in centered relation with respect to the adjacent fan blades, forwardly thereof and well toward the tips of the same, the liquid is discharged in a direction substantially tangential to the circular path of the blade tips and into the air stream where its velocity is greatest. The liquid intake connection 26′, of the receiver 26, provides for its attachment, by a suitable length of flexible hose or the like (not shown), to a drum, tank, or other suitable container, of a capacity to hold a fair supply of the liquid to be employed. By spacing the spray arms 34, together with the nozzles 36, forwardly of the fan 32, the discharged liquid is caught by the air stream and blasted away from contact with the blades of the fan, so that deposit of the liquid on the latter, or the bearing housing 14, is prevented.

What I claim is:

A spray apparatus comprising a hollow housing having a pair of aligned apertures in the opposite sides thereof, a rotatable hollow shaft projecting through said apertures and journalled intermediate its ends within said housing, a plurality of spaced atomizing nozzles secured to one end of said shaft and spaced from said housing, each of said nozzles being in communication with the interior of said hollow shaft, a fan secured to said shaft intermediate said housing and said nozzles and spaced from the latter, means secured to said shaft for connection to a source of power for rotating said shaft, and means carried by said housing adjacent the other end of said shaft for connecting the latter to a supply of fluid spraying material, said last mentioned means comprising a yoke with the legs thereof positioned in embracing relation with respect to the adjacent end of said housing and secured to the latter, the bight of said yoke being positioned adjacent said other end of said shaft and being provided with a receiver chamber, said receiver chamber being in communication with the shaft adjacent thereto and to a supply of fluid spraying material.

CLAUDE ROSCOE STRICKLAND.

REFERENCES CITED

The following references are of record in the file of this patent:

UNITED STATES PATENTS

| Number | Name | Date |
|---|---|---|
| 820,247 | Nordensson | May 8, 1906 |
| 1,098,389 | Lister | June 2, 1914 |
| 1,586,997 | Hull | June 1, 1926 |
| 1,883,456 | Ashley | Oct. 18, 1932 |